Dec. 20, 1960 A. J. ROCCATI 2,964,849
OPTICAL TRACKING SYSTEM FOR ROTARY BLADE AIRCRAFT IN FLIGHT
Filed Nov. 5, 1956 2 Sheets-Sheet 1
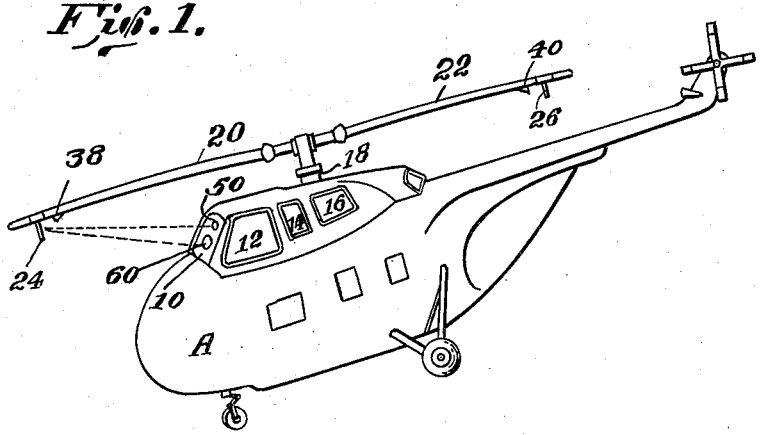
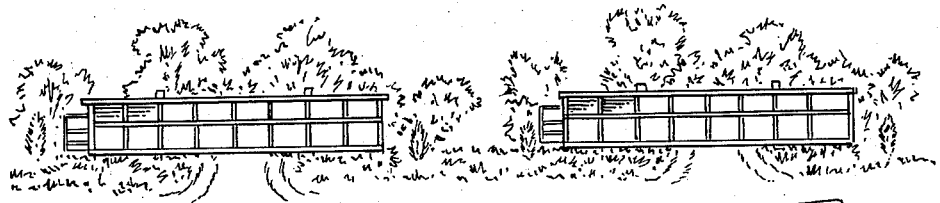
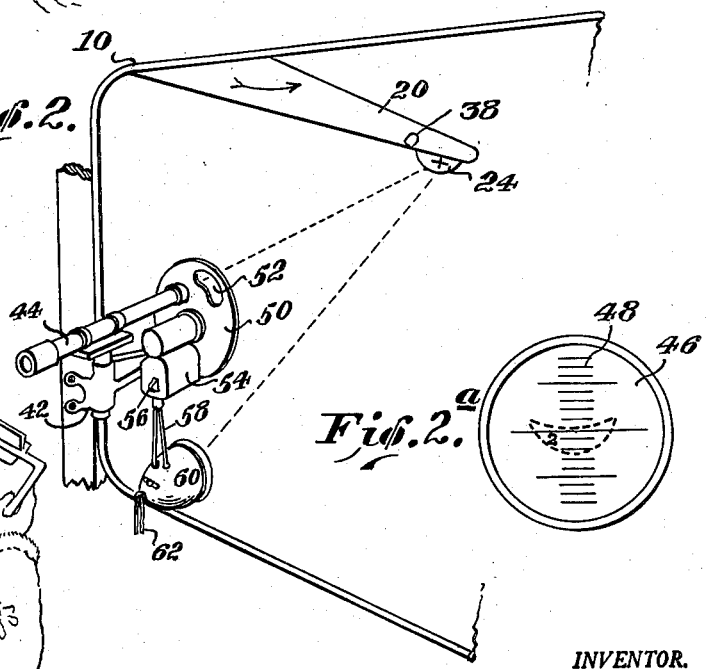
INVENTOR.
Arnold John Roccati.
BY
Attorneys.

Dec. 20, 1960 A. J. ROCCATI 2,964,849
OPTICAL TRACKING SYSTEM FOR ROTARY BLADE AIRCRAFT IN FLIGHT
Filed Nov. 5, 1956 2 Sheets-Sheet 2
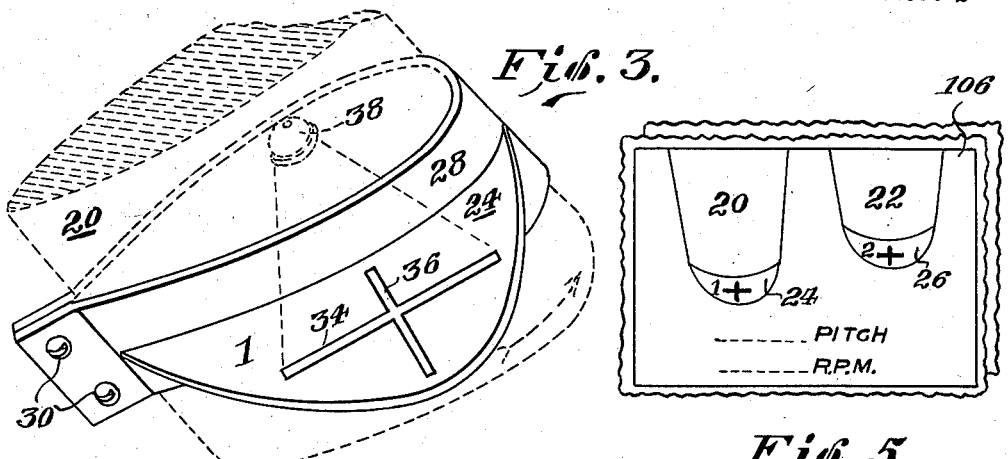
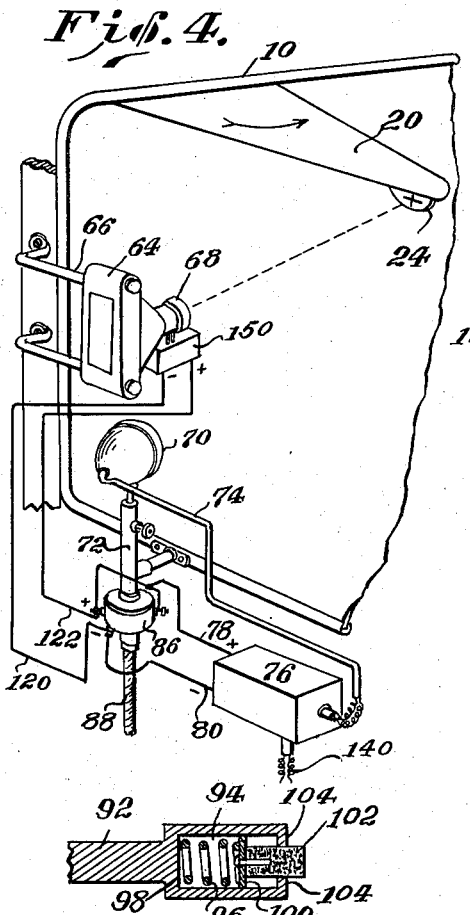
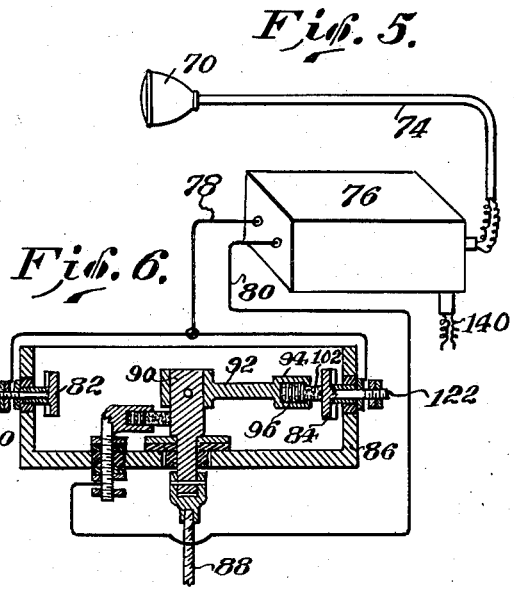
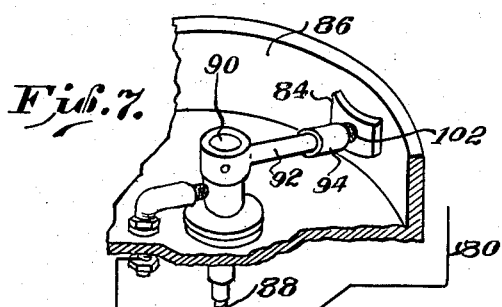
INVENTOR.
Arnold John Roccati.
BY
Attorneys.

United States Patent Office 2,964,849
Patented Dec. 20, 1960

2,964,849

OPTICAL TRACKING SYSTEM FOR ROTARY BLADE AIRCRAFT IN FLIGHT

Arnold J. Roccati, Rockville, Md., assignor to Fairchild Engine and Airplane Corporation, Hagerstown, Md., a corporation of Maryland Filed Nov. 5, 1956, Ser. No. 620,296

7 Claims. (Cl. 33—46)

This invention relates to an apparatus and method for tracking the main blades of a rotary wing aircraft such as a helicopter, during the actual flight of said aircraft, as distinguished from simulated flight, or non-flight tracking apparatus and methods.

Rotary blade tracking apparatus and methods in use today leave much to be desired as to the accuracy of determining the in-flight relative positions of the blades to each other, the safety factor of aircraft personnel, and the ability to obtain accurate records of tracking during different conditions in flight.

The principal object of the invention, therefore, it to provide an apparatus and method which will accurately determine the tracking of the individual blades, at various speeds and pitch adjustments during actual flight.

Another object of the invention is the provision of an optical system by which it will be possible to determine the in-flight tracking of the individual blades.

An additional object is to provide a system for making a permanent record of the tracking of the main blades of a helicopter in flight.

A further object is to provide a method and means for in-flight tracking of the main blades of a helicopter which is relatively inexpensive, light in weight and which will achieve the desired accuracy without the need of trained specialists.

Yet another object is to provide a means and method for in-flight tracking either during the day or at night.

Other objects will appear hereinafter throughout the specification.

In the drawings:

Figure 1 is a perspective view of a helicopter in flight equipped with the device of this invention;

Figure 2 is an enlarged perspective view, partly broken away, of one form of the invention;

Figure 2a is a reticule in the telescope tube shown in Figure 1;

Figure 3 is a fragmentary view of one of the wing tips partly broken away with a target attached thereto;

Figure 4 is a perspective view similar to Figure 2 of a second form of the invention;

Figure 5 is a composite photograph showing the position of the targets on the several blades;

Figure 6 is a diagrammatic view, partly in section, of the flash unit of Figure 4 with the top removed;

Figure 7 is an enlarged perspective view, partly broken away and partly in section, of the rotor of the flash unit, and Figure 8 is a vertical section, partly broken away, of the arm and the brush mounting of the flash unit.

When an out-of-track condition exists of the main blades of a helicopter due to the blades rotating in different paths, the resulting vibration produces an undesirable effect upon the operational flight characteristics of the aircraft, and may actually be sufficiently severe so as to cause structural damage thereto. Even mild vibrations caused by such blades when out of track, while they may not have an adverse effect upon the aircraft, are nevertheless a source of pilot fatigue, and for this reason should be avoided. In order to correct this condition it is necessary to determine the amount of elevation between the several blade paths, and to adjust the blades so that they move in a single path.

The operation of blade tracking includes the measurement of the rotor blade tip path displacements relative to each other for different motor shaft r.p.m., and blade pitch. This also includes a proper analysis of the blade displacement data to determine the cause of the out-of-track condition, and the adjustment of the blade system to bring the blades into proper path alignment with each other. The necessity for more or less blade tracking will vary according to the different type of rotary blade aircraft in actual use, some helicopters requiring more frequent tracking than others. However, it is desirable to track the blades during overhauling, and at any time the pilot reports unfavorable track characteristics. Blade tracking is also necessary after any work on the rotor system has been performed, in which the original adjustments have not been maintained.

One of the prior methods of blade tracking requires the coating of the blade tips with a layer of chalk or crayon, a different color being used on each blade. A ground supported canvas flag is mounted on a rod which is then moved into the path of the blade tips while the aircraft is ground supported. As the blades rotate, the tips striking the flag will leave a colored trace of that color of the blade which strikes the flag, the several colored traces of the blades showing the relative blade positons. This system requires considerable time for accurate adjustment and is dangerous to personnel and aircraft. Moreover, it is not possible to provide in-flight tracking with this system. Damaged blades may occur if the flag support is struck by the rotary blades. This damage may not be limited to collision damage since excessive vibration from a damaged blade may result in serious damage to the entire aircraft. Moreover, on larger rotary blade aircraft, where the main blades are a considerable distance above the ground, the difficulty of proper tracking and inherent personnel danger are much increased.

A second method includes the provision of a brush or sponge saturated with marking paint which is attached to a rod, the same being slowly raised into the plane of rotation of the ground supported aircraft until the lowest blade is contacted. This low blade is then adjusted and the process repeated until all blades are in track. The hazard to the aircraft and to personnel safety is even greater than in the preceding method. In addition, no information can be obtained relative to the degree of out-of-track of the blades, and therefore much time is required to achieved proper tracking. Moreover, it would be almost impossible to track rotors having a plurality of blades with this method. In-flight tracking would be impossible with this method, except by the "pogo stick" method.

The apparatus and method of the present invention overcomes the limitations of the prior art devices stated above, and is adaptable to all rotary wing aircraft for measuring the in-flight tracking of the main blades thereof. Moreover it is simpler to operate by aircraft mechanics than other methods, and requires no special techniques or procedures that would make necessary special skills on the part of a typical aircraft mechanic. The invention is capable of being operated under field conditions with a minimum of adjustments.

Referring to the drawings, and particularly Figures 1 and 2, there has been illustrated a typical system for measuring the in-flight tracking of the main blades of rotor wing aircraft hereinafter referred to as a helicopter, in accordance with the present invention. One form of the invention consists of a system and method for measuring the tip path of a helicopter main rotor blade wherein a telescope with a suitable mounting means is located in the helicopter in such position that the person making the tracking run may sight through the telescope at targets on the rotor blade tips during flight. The track may consist of a downwardly extending flap, or a light source, or may be a reflector (not shown) which is illuminated by a spot light mounted in the helicopter. If the source of illumination is mounted on the blades different colored lights may be used to provide a means for identifying the different rotor blades. The reticule in the telescope tube provides a means for measuring the relative displacements of the several rotor blades. The person making the tracking system run, sights through the telescope at the blade tips and notes the relative displacements of the blades on the reticule for each of them, and makes notes of these sightings. From this data the cause of the out-of-track condition may be determined, and proper corrective measures taken.

Referring to Figures 1, 2 and 2a, the letter A indicates a fuselage of a helicopter having the usual cabin space and provided with a plurality of windows 10, 12, 14 and 16. The hub 18 is provided with the usual controls, not shown, for the rotary blades 20 and 22.

Only two blades have been shown, it being understood that any suitable number of blades may be used, according to the type or make of helicopter being used.

The blade tips are provided adjacent their edges with targets 24 and 26. Said targets, one of which is illustrated in Figure 3, may be removably clamped or otherwise secured to the blade tip. As shown in Figure 3, the clamping means consists of a strap 28 that encircles the blade tip, the end of which may be frictionally held together by screws or other retaining means 30. Each target is provided with a target viewing area extending in a vertical direction and containing a horizontal line 34 and a vertical line 36.

It is one of the objects of this invention to provide individual target identifying means so that the target on each blade may be readily observed and identified with that blade. This result may be obtained by using different colored lights on individual blades, this method of construction being particularly adaptable for night operation. Supplemental to the lights or in substitution therefor the targets may be given different numbers, the number "1" as shown in Figure 3 being plainly indicated on target 24, it being understood that a different number such as "2" would be indicated on the target 26 of blade 22, as seen in Figure 5. Alternately, the targets may each be of a different identifying color.

Mounted in the window 10, as shown in detail in Figures 2 and 2a, is a bracket 42 which supports a telescope 44 having a reticule 46 provided with graduations 48. These graduations permit observation of the degree of out-of-track movement of the individual blade targets. A chart, not shown, would be marked to show the out-of-track relationship for any particular helicopter.

A shutter 50 having an aperture 52 is driven by a motor 54. The speed and the turning on and off of the motor will be regulated by the control 56. This motor is provided with wires 58 connected to a suitable source of electric potential, not shown, such as the battery of the helicopter motor. As shown in Figure 2, however, the wires are connected to spot light 60 whose wires 62 are directly connected to the battery. The speed of the shutter 50 is synchronized with the speed of the rotary wing blade, thus allowing the observer to view the blade track at only one point of its arc. In place of the motor 54 the power for driving the shutter may be a shaft connected to the shutter which receives its power from the main rotor shaft.

The stroboscopic effect of the shutter will make the blades appear to stand still and enable the observer to record the tracking error by noting the deviations in terms of graduations. These graduations would correspond to various areas of sight-to-track distance and a chart would be furnished on which would be noted said errors, as stated above. The lights 38 and 40 on the rotary blades, or the spotlight 60, would be used during night in-flight testing, it being understood that either the blade lights 38 and 40 would be used, or a spotlight could be used during such night testing. The numbers on the targets, of course, would be used during either daytime or nighttime in-flight testing, or colors or other distinctive marking could be made on individual targets.

Referring to Figures 4 to 8 inclusive, window 10 is provided with a photographic sysem that includes a camera 64 clampingly mounted at 66, on the window frame, said camera having a lens 68 which is properly focused on the target 24 of blade 20, corresponding to targets 24 and 26 of Figure 1. An electronic flash unit 70 is adjustably mounted on a bracket 72 also mounted on said window frame, the light being constructed and arranged to flash once for each rotation of the blade, so that there will be two pictures taken for a two blade aircraft being observed, or three pictures taken if a three blade aircraft is being tested. The electronic flash unit 70 is connected by wires 74 to a power unit 76 having leads 78 and 80 and leads 140 to the battery of the aircraft, not shown. The leads 78 and 80 connect to contact segments 82 and 84 which are fixedly mounted in but electrically insulated from a stationary mounting drum or spider 86.

A flexible drive shaft 88 is connected so as to be driven from the main shaft of the aircraft by conventional reduction gearing, not shown, or a variable speed electric motor may be substituted therefor as shown at 54 in Figure 2. Referring to Figure 6, shaft 88 drives shaft 90 mounted in the drum 86, and on this shaft is fixedly mounted an arm 92 having a hollow end portion 94. This end receives a spring 96, as shown in Figure 8, which is of the expansible type, one end of which engages the inner face of the hollow end 94. The other end of the spring engages the disk 100 which is fixed to the carbon brush or other contact 102 as seen in Figure 8. The disk 100 is prevented from moving too far to the right by the inwardly turned edges 104 of the end portion 94. Bracket 72 supports drum 86.

The picture is shown in Figure 5 at 106. This picture has a plurality of exposures corresponding to the number of flashes of the electronic flash unit 70, it being understood that only one rotation of the blades is made during the taking of the picture, the electronic flash unit functioning to take one exposure of each blade during one complete rotation of the blades. The camera 64 is of the type which permits notation on the film of various data such as the pitch of the blades, speed of rotation. etc.

This camera is of the Land type which gives a finished photograph in one minute. Preferably a telephoto lens is used to give a close-up of the target 32, and the other blade targets. not shown. The camera shutter is synchronized with the speed of rotation of the blades. A power pack 150 having a solenoid connection to the shutter 68 is diagrammatically shown in Figure 4. The power pack is electrically connected by wires 120 and 122 to contact segments 82 and 84, and power unit 76 is connected by wires 140 to the battery system of the aircraft. The control system for this unit would operate in such a manner that one picture of each blade in one rotor cycle would be photographed at a time, and an observer would notate the rotor speed, blade pitch angle and other pertinent information on the back of each picture. Data analysis could be accomplished quickly by having a transparent, calibrated grid (not shown) for each aircraft type. This grid when superimposed over the print would immediately give the tracking error of the blades. By proper construction of the synchronizer, such as by using shaft 88 connected to the rotor shaft, the various rotor blades would be made to print side by side, as shown in Figure 5, thus making it easier to identify each blade and read its relative deviation. It is to be noted that the print shown in Figure 5 shows targets 24 and 26 on blades 20 and 22, the individual targets being numbered "1" and "2."

It will be appreciated that the structure shown in Figures 4, 6, 7 and 8 would work more effectively during in-flight night operations. The synchronization of the rotor with the flash unit as explained above would make an exposure of each blade target and there would be no negative effect from anything except the rotor blades. It is possible that the photoflash system could be used during the day if the flash from the electronic flash unit be of sufficient intensity.

The targets would be mounted the same distance and adjacent the tip of each rotary blade.

Finally, it will be understood that once the out of track characteristics of a blade at different speeds and pitch adjustments have been determined, suitable adjustments will be made to the blade to bring each blade in proper tracking position, following which a further test would be made of the blades following their adjustment.

It will be obvious to those skilled in the art that various modifications may be made in the invention without departing from the spirit and scope of the appended claims.

What is claimed is:

1. In a device for in-flight helicopter blade tracking wherein said helicopter is provided with a cabin, a power driven hub and a plurality of main rotor wing blades, a plurality of targets for said blades, each target having a portion extending substantially at right angles from the lower side of its blade, one for each blade, each target being operatively supported on said blade adjacent the blade tip, said targets being equidistant from said hub, pilot accessible means mounted on said helicopter for determining the relative positions of the said targets in the direction of the axis of the rotor during in-flight movements of said helicopter, said last named means including light interrupting means, and means for operating said last named means in synchronism with the rotary movements of said blades.

2. In a device for in-flight helicopter blade tracking wherein said helicopter is provided with a cabin, a power driven hub and a plurality of main rotor wing blades, a plurality of targets for said blades, each target having a portion extending substantially at right angles from said blades, one for each blade, each target being operatively suported on said blade adjacent the blade tip, said targets being equidistant from said hub, photographic means mounted on said helicopter for determining the relative positions of the said targets in the direction of the axis of the rotor during in-flight movements of said helicopter, said last named means including light interrupting means, and means for operating said last named means in synchronism with the rotary movements of said blades.

3. In a device for in-flight helicopter blade tracking wherein said helicopter is provided with a cabin, a power driven hub and a plurality of main rotor wing blades, a plurality of targets for said blades, each target having a portion extending substantially at right angles from the lower side of its blade, one for each blade, each target being operatively supported on said blade adjacent the blade tip, pilot accessible means mounted on said helicopter for determining the relative positions of the said targets in the direction of the axis of the rotor during in-flight movements of said helicopter, said last named means including light interrupting means, and means for operating said last named means in synchronism with the rotary movements of said blades, each of said targets having its own identifying insignia means whereby the tracking of each blade may be determined under various flight conditions.

4. In a device for in-flight helicopter blade tracking wherein said helicopter is provided with a cabin, a power driven hub and a plurality of main rotor wing blades, a plurality of targets for said blades, each target having a portion extending substantially at right angles from said blades, one for each blade, each target being operatively supported on said blade adjacent the blade tip, said targets being equidistant from said hub, photographic means mounted on said helicopter for determining the relative positions of the said targets in the direction of the axis of the rotor during in-flight movements of said helicopter, said last named means including light interrupting means, and means for operating said last named means in synchronism with the rotary movements of said blades, each of said targets having its own identifying insignia means whereby the tracking of each blade may be determined under various flight conditions.

5. In a device for in-flight helicopter blade tracking wherein said helicopter is provided with a cabin, a power driven hub and a plurality of main rotor wing blades, a plurality of targets for said blades, each target having a portion extending substantially at right angles from the lower side of its blade, one for each blade, each target being operatively supported on said blade adjacent the blade tip, pilot accessible means mounted on said helicopter for determining the relative positions of the said targets in the direction of the axis of the rotor during in-flight movements of said helicopter, said last named means including light interrupting means, and means for operating said last named means in synchronism with the rotary movements of said blades, each of said targets having its own identifying insignia means whereby the tracking of each blade may be determined under various flight conditions, said pilot accessible means comprising optical observing means.

6. In a device for in-flight helicopter blade tracking wherein said helicopter is provided with a cabin, a power driven hub and a plurality of main rotor wing blades, a plurality of targets for said blades, each target having a portion extending substantially at right angles from the lower side of its blade, one for each blade, each target being operatively supported adjacent the blade tip, said targets being equidistant from said hub, pilot accessible means mounted on said helicopter for determining the relative positions of the said targets in the direction of the axis of the rotor during in-flight movements of said helicopter, each of said targets having its own identifying insignia means whereby the tracking of each blade may be determined under various flight conditions, said pilot accessible means comprising optical observing means including a rotary shutter, and means for driving said shutter in synchronism with said rotary blades.

7. In a device for in-flight helicopter blade tracking wherein said helicopter is provided with a cabin, a power driven hub and a plurality of main rotor wing blades, a plurality of targets for said blades, each target having a portion extending substantially at right angles from said blades, one for each blade, each target being operatively supported adjacent the blade tip, said targets being equidistant from said hub, photographic means mounted on said helicopter for determining the relative positions of the said targets in the direction of the axis of the rotor during in-flight movements of said helicopter, each of said targets having its own identifying insignia means whereby the tracking of each blade may be determined under various flight conditions, an electronic flash unit mounted for directing its flash at said targets, and means for operating said flash unit in synchronism with said rotary blades.

References Cited in the file of this patent

UNITED STATES PATENTS

| 1,071,815 | Sperry | Sept. 2, 1913 |
|---|---|---|
| 1,566,124 | Rogers | Dec. 15, 1925 |
| 2,198,836 | Patton | Apr. 30, 1940 |
| 2,198,837 | Morgan | Apr. 30, 1940 |
| 2,302,496 | Gasser | Nov. 17, 1942 |
| 2,538,769 | Drake | Jan. 23, 1951 |
| 2,581,459 | Tyra | Jan. 8, 1952 |